Patented Jan. 19, 1932

1,841,922

UNITED STATES PATENT OFFICE

EDMUND STEIL, OF BERLIN, GERMANY, ASSIGNOR TO AMERICAN GASACCUMULATOR COMPANY, OF ELIZABETH, NEW JERSEY, A CORPORATION OF NEW JERSEY

POROUS MASS AND METHOD OF MAKING SAME

No Drawing. Application filed October 22, 1925, Serial No. 64,274, and in Germany November 1, 1924.

In the storage and distribution of certain explosive gases, such as acetylene, it is the practice to introduce the same into steel tanks or receivers filled with porous masses and containing a suitable liquid solvent, such as acetone, for the gas uniformly distributed throughout the mass. The gases are charged into the tanks or receivers under pressure, are dissolved by the liquid, and are adapted to be delivered from the tank or receiver upon release of the pressure.

This practice of storing and distributing gases, particularly acetylene gas, has been followed for a number of years and from time to time various kinds of material have been employed in the manufacture of the porous masses. These masses have been constructed or made not only of inorganic substances characterized by the necessary porosity, but also of organic substances such as cellulose, kapok, silk, wood sawdust, cotton, peat, animal hair and the like.

One difficulty which has been encountered in connection with the use of organic porous substances has been that in case of a local explosion at any point within the tank or receiver such substances have not operated to prevent decomposition of the gas due to the fact that the organic substances have become charred or destroyed by the heat generated by such explosions. Attempts have been made to overcome this difficulty but without success.

The present invention has for its general object to provide means whereby a porous mass consisting of organic substances of the character above indicated may be enabled to resist charring or destruction due to local explosions and to thereby prevent decomposition of the gas within the mass in the tank or receiver.

It is also an object of the invention to provide a porous mass for the storage of explosive gases, such as acetylene, consisting of organic substances combined or associated with a substance or substances of incombustible and heat resisting character whereby charring or destruction of the organic substance is prevented.

Another object of the invention is to provide a porous mass consisting of organic substance of suitable character which substance is coated or impregnated with a composition of matter having incombustible and heat resisting qualities of a character to prevent charring or destruction of the said organic substance in case of a local explosion in the mass within a tank or receiver.

A further object of the invention is to provide a porous mass for receivers for the storage of explosive gases, such as acetylene, consisting of organic substance either impregnated or coated with a metallic composition whereby the said substance is rendered heat resisting and incombustible for the purpose of preventing charring or destruction of the same in case of a local explosion within the mass in a tank or receiver.

It is also an object of the invention to provide a novel method by which my new and improved porous mass for receivers may be manufactured efficiently and economically.

In order that the characteristics and purposes of my invention may be more clearly understood I shall now proceed to a detailed description thereof and of the method of making the same.

Before the organic substance, whatever it may be, is combined or associated with the heat resisting or incombustible substances which it is proposed to use, it should be thoroughly and suitably cleansed for the purpose of eliminating any substances which might be present therein and which might form injurious compositions with the liquid solvent, such as acetone, or with the gas to be stored within the porous mass in a tank or receiver.

In one method employed by me in the manufacture of a porous mass embodying my invention the organic substance, such as cellulose, wood sawdust, kapok, or any other organic substance known in the art as being suitable for use in the manufacture of porous masses, or a mixture thereof, is saturated with a solution of calcium chloride. Such saturation may be effected either before or after the substance is placed in a tank or receiver. The organic substance, having been thus saturated, is then treated and subjected to the action of water glass (sodium silicate). As a result of the reaction which takes place between these substances a silicious composition is formed in the pores and on the surfaces of the fibers of the organic substance.

Instead of employing calcium chloride and water glass for impregnating or coating, or both, the organic substance I may employ a solution of either a zinc or a copper salt for first saturating or treating the organic substances, and thereafter treat the said substances so saturated with a solution of resin soap. Instead of employing a solution of resin soap I may use a solution either of barium sulphide or ferrous sulphate. The reaction between a zinc or copper salt and either a resin soap solution, or a solution of barium sulphide or ferrous sulphate produces a composition of a suitable character which is in such combination or association with the organic substance as to render the same heat resistant or incombustible so that charring or destruction thereof is prevented in case of a local explosion of the gas within the mass in a tank or receiver and the propagation and extension of the explosion thereby.

The order or succession of the steps taken in the carrying out of the method of treating organic substances such as those above mentioned, or others which may be found to be suitable for the purpose, or a mixture thereof, is immaterial, and such order or succession may be followed as may be found most suitable for each particular mass. The essential thing is that the heat resisting substance which may be precipitated or formed shall impregnate or thoroughly coat the particles of the organic filling substance, and also that the said substance which is precipitated or formed shall be in a finely divided state. Preferably, however, the substance which is precipitated upon the particles of the filling substance consists of a metal salt which is insoluble in water as well as in the solvent for the gas although water soluble substances may be used.

One advantage of the invention not heretofore specifically referred to is that the precipitation or formation of an inorganic substance of the character indicated within and upon the fibers of the organic substance of the porous mass results in diminishing the size of the pores of the mass, whereby their capillarity is increased, thereby increasing the effectiveness of the mass to prevent explosion of the gas therein.

It will be seen that by my invention I have provided not only a new and improved method for the manufacture of porous masses for the storage of explosive gases, such as acetylene, in storage tanks or receivers, but have also provided a novel mass which in addition to being heat resisting and incombustible also is characterized by the presence of a great number of pores of reduced size or diameter whereby the efficiency and safety of the mass are enhanced.

In order that the principle of my invention may be more readily and fully understood I have mentioned certain specific substances which may be employed in the treatment of organic substances in the manufacture of porous masses, but I do not desire that my invention shall be regarded as being limited to these particular substances or materials. The essential feature of my invention is that the constituent particles of the organic substances employed in the manufacture of porous masses shall be intimately associated with a compound or suitable substance in such manner as to prevent charring or destruction thereof in case of explosion of a gas within a mass in a tank or receiver.

Having thus described my invention, what I claim and desire to secure by Letters Patent is:

1. The method of producing a porous mass for the storage of explosive gases, which comprises the saturation of porous organic substances with a water solution of calcium chloride and thereafter treating the said porous mass with a solution of water glass.

2. The method of producing a porous mass for the storage of explosive gases, which comprises as a step the precipitation of a silicious compound of the character described upon the fibers of organic substances, which compound includes calcium as a constitutent.

3. A porous mass for the storage of explosive gases, comprising a porous organic substance adapted for such masses, which mass is impregnated with a compound consisting of a substance produced by the reaction between a solution of calcium chloride and a solution of water glass.

4. A porous mass for the storage of explosive gases, comprising an organic filler impregnated with an insoluble metal salt having fire-proofing properties.

5. A porous mass for the storage of explosive gases, comprising a porous combustible filler upon the particles of which an insoluble metal salt having fire-proofing properties is precipitated.

6. The method of producing a porous mass for the storage of explosive gases which comprises precipitating upon the particles of a combustible filler, an insoluble fire-proofing metal salt.

7. A porous mass for the storage of explosive gases, comprising a combustible filler impregnated with an insoluble fire-proofing metal salt such as an insoluble metal soap.

8. A porous mass for the storage of explosive gases, which comprises a combustible organic filler impregnated with an insoluble fire-proofing metal salt such as an insoluble metal soap.

In testimony that I claim the foregoing as my invention, I have hereunto signed my name this 9th day of October, 1925.

EDMUND STEIL.